United States Patent
Lenz, Jr. et al.

(10) Patent No.: US 10,603,531 B2
(45) Date of Patent: Mar. 31, 2020

(54) SELF CONTAINED BREATHING APPARATUS AND EQUIPMENT STORAGE UNITS FOR FIREFIGHTING APPARATUS AND RELATED METHODS

(71) Applicant: HME, Incorporated, Wyoming, MI (US)

(72) Inventors: Kenneth C. Lenz, Jr., Hudsonville, MI (US); Kevin J. Longhurst, Grand Rapids, MI (US)

(73) Assignee: HME, Incorporated, Wyoming, MI (US)

( * ) Notice: Subject to any disclaimer, the term of this patent is extended or adjusted under 35 U.S.C. 154(b) by 70 days.

(21) Appl. No.: 16/007,402

(22) Filed: Jun. 13, 2018

(65) Prior Publication Data
US 2019/0381346 A1    Dec. 19, 2019

(51) Int. Cl.
*A62C 27/00* (2006.01)
*B60R 5/00* (2006.01)
*A62B 7/00* (2006.01)

(52) U.S. Cl.
CPC ............ *A62C 27/00* (2013.01); *A62B 7/00* (2013.01); *B60R 5/00* (2013.01)

(58) Field of Classification Search
CPC ............ A62C 27/00; A62B 7/00; B60R 5/00
See application file for complete search history.

(56) References Cited

U.S. PATENT DOCUMENTS

| 4,160,323 A * | 7/1979 | Tracy | A61G 15/14 312/209 |
| 6,883,766 B1 * | 4/2005 | Ziaylek | A62B 9/04 248/154 |

(Continued)

FOREIGN PATENT DOCUMENTS

WO    WO-2006012475 A2 *    2/2006    ............... A62B 7/02

OTHER PUBLICATIONS

Tutterow, Robert, SCBS "Out of Cab"!, Fire Apparatus Magazine, vol. 22, Issue 12, Dec. 20, 2017 downloaded from http://www.fireapparatusmagazine.com/articles/print/volume-22/issue-12/departments/keeping-it-safe/scba-out-of-cab.html on Apr. 25, 2018.
(Continued)

*Primary Examiner* — Lori L Lyjak
(74) *Attorney, Agent, or Firm* — Warner Norcross + Judd LLP (57) ABSTRACT

A firefighting or rescue apparatus includes a cab and a body having a storage unit configured to store a self-contained breathing apparatus, contaminated by harmful chemicals at an emergency scene, in the body rather than in the cab where occupants ride, so the occupants are not exposed to the harmful chemicals, which might be hazardous, toxic, carcinogenic or otherwise deleterious to health. The storage unit can include a storage wall mounted on upper and lower telescoping rail systems, and can be selectively movable relative to a compartment opening from a storage mode, where the storage wall is disposed in a compartment to a retrieval mode, where the storage wall extends beyond the opening so a user can access air tank supports to store a self-contained breathing apparatus. Related methods of storing a contaminated apparatus in the storage unit, distal from the cab and occupants thereof, are also provided.

20 Claims, 7 Drawing Sheets

(56) References Cited

U.S. PATENT DOCUMENTS

| | | | |
|---|---|---|---|
| 6,926,243 B1* | 8/2005 | Ziaylek | A62B 25/00 248/307 |
| 2006/0118149 A1 | 6/2006 | Benson et al. | |
| 2009/0178675 A1* | 7/2009 | Turiello | A62B 13/00 128/202.13 |
| 2010/0038100 A1* | 2/2010 | Schuetzle | A62C 27/00 169/52 |
| 2010/0089489 A1* | 4/2010 | Turiello | A62B 7/02 141/2 |
| 2011/0030838 A1* | 2/2011 | Turiello | A62B 7/02 141/1 |
| 2011/0259614 A1* | 10/2011 | Ver Steeg | A62C 27/00 169/24 |
| 2012/0138645 A1* | 6/2012 | Nicoletti, III | A62B 25/00 224/242 |
| 2015/0152636 A1* | 6/2015 | Connell | E04H 1/1261 52/79.1 |
| 2016/0144209 A1* | 5/2016 | Moore | A62C 27/00 169/24 |
| 2017/0120834 A1* | 5/2017 | McLoughlin | A62C 27/00 |
| 2018/0289999 A1* | 10/2018 | Kay | G06Q 10/00 |

OTHER PUBLICATIONS

QUIC-Access Steel Wall Cabinets for SCBA Model WC-1, Parts and Instruction Manual, downloaded from https://www.ziamatic.com/wp-content/uploads/5005PM1.pdf downloaded Apr. 25, 2018.

Ziamatic Bench Mounted O2 Cylinder downloaded from https://www.thebigredguide.com/images/moreimages/news_may12/combined_220.jpg on Apr. 25, 2018.

Ziamatic Slide Assembly downloaded from http://www.ziamatic.com/wp-content/uploads/QR-SA-Application.jpg on Apr. 25, 2018.

\* cited by examiner

SELF CONTAINED BREATHING APPARATUS AND EQUIPMENT STORAGE UNITS FOR FIREFIGHTING APPARATUS AND RELATED METHODS

BACKGROUND OF THE INVENTION

The present invention relates to a firefighting apparatus, such as a fire truck, a trailer or other vehicle, and more particularly to a firefighting apparatus including a storage unit configured to store contaminated self-contained breathing apparatus and equipment to thereby reduce exposure of firefighters and other personnel to harmful chemicals that can be toxic, hazardous and/or carcinogenic.

Firefighters are known for their preparedness and ability to quickly deploy to a fire or emergency scene in a firefighting vehicle, such as a fire truck. Typically, a firefighter will don their equipment, such as boots, bibs, a coat, and a helmet, and stow their self-contained breathing apparatus nearby, before getting into the vehicle, so as to save critical time when the fire fighter arrives at the scene.

At a typical firefighting or emergency scene, a firefighter can be exposed to a variety of chemicals. These chemicals can be present in the materials used by the firefighters to extinguish or contain fire, such as flame retardants, foams, and other treatments. The chemicals also can be present in materials located at the scene. When the materials burn, the chemicals can become airborne, which is why a firefighter will wear their self-contained breathing apparatus to prevent the firefighter from directly breathing in the chemicals. When at a scene, a firefighter unintentionally can be exposed to the chemicals, for example, by not donning the mask soon enough, or removing the mask before exposure to the chemicals has subsided.

Notably, while a firefighter is at a scene, their equipment, including their self-contained breathing apparatus, frequently becomes exposed to the chemicals. Thus, these items become contaminated with chemicals, which can be toxic, hazardous and/or carcinogenic. In the interest of exiting and quickly cleaning up a scene, however, many firefighters will remove the self-contained breathing apparatus and equipment from their body, then climb into the cab of a vehicle with those items to return to the firehouse. Accordingly, the contaminated items remain in the cab of the vehicle, and in close proximity to the firefighter or occupants of the cab, until the items are removed from the cab and washed back at the firehouse. In this manner, the very chemicals that the self-contained breathing apparatus and protective equipment are designed to protect the firefighter from are brought into close proximity to that firefighter in the vehicle, after the firefighting or emergency activity has ceased.

This exposure to chemicals, and in particular toxic, hazardous and/or carcinogenic chemicals has been of an increasing concern among the firefighting community. In particular, when materials at a fire ground contain toxic chemicals or substances, the firefighters health and safety can be placed at significant risk. In recent years, there is been a statistical observation that firefighters have an increased rate of cancer. Some believe that this increased rate of cancer is caused by the repeated exposure over many years to toxic, hazardous and/or carcinogenic substances encountered during a firefighting activity. Many departments have implemented procedural changes to prevent exposure to the substances and to monitor the health and of firefighters. For example, many policies urge firefighters to transport their self-contained breathing apparatus in the truck cab and to quickly don the apparatus upon exiting the truck, or when any hazardous or toxic chemicals are detected at a fire ground or scene. The threat of exposure to hazardous substances and carcinogens in smoke, however, is realized by firefighters only when the presence of the smoke and is appreciated. In many cases, hazardous chemicals can be airborne at a scene even when a firefighter cannot see them. Even where firefighters take extra efforts to utilize their breathing apparatus and other equipment, those firefighters can inadvertently expose themselves to hazardous chemicals after the firefighting or emergency activity is completed by continuing to carry around contaminated equipment. Indeed, in many cases, they take the contaminants back to the firehouse, thereby exposing themselves and others to the contaminants until the equipment is properly washed down.

Accordingly, there remains room for improving firefighting vehicles to limit and/or prevent inadvertent exposure of firefighters or other personnel to chemicals that can be hazardous, toxic and/or carcinogenic.

SUMMARY OF THE INVENTION

A firefighting or rescue apparatus is provided including an onboard storage unit distal from a cab of the apparatus and configured to isolate contaminated self-contained breathing apparatus and/or equipment, thereby limiting exposure of firefighters or other personnel within the cab to harmful chemicals that are hazardous, toxic, carcinogenic or otherwise deleterious to health.

In one embodiment, the firefighting or rescue apparatus includes a cab and a body distal from the cab. The body includes a storage unit that defines a compartment. The compartment can include an opening. The storage unit can include a storage wall mounted on upper and lower telescoping rail systems. The storage wall can be selectively movable relative to the opening from a storage mode, in which the storage wall is disposed in the compartment, and a retrieval mode, in which the storage wall extends beyond the opening so a user can access air tank supports to store a self-contained breathing apparatus, with an air tank thereof supported relative to the storage wall.

In another embodiment, the storage wall can include an upper support plate and a lower support plate joined with the upper and lower telescoping rail systems. A first locking member can be joined with at least one of the upper support plate, the lower support plate and the storage wall. The locking member can be operable in a locking mode in which the locking member holds the storage wall in either the storage mode or the retrieval mode. The locking member can secure the storage wall and the rails in the compartment during transport and movement of the firefighting apparatus to prevent the self-contained breathing apparatus from becoming damaged.

In a further embodiment, the storage wall can include a first side and a second side. The first side can include one or more first air tank supports, the second side can include one or more second air tank supports. Having these different sides and their air tank supports can increase the total capacity of the storage wall and enable users to store more tanks on the wall for quick access.

In still a further embodiment, the storage wall can include an axis of rotation. For example, the storage wall can be rotatably mounted on one or more axles joined with the upper and/or lower support plates. The storage wall can be rotatable about the axis of rotation to selectively access the first side and/or the second side quickly and efficiently.

In an even further embodiment, the storage wall can be rotatable about the axis of rotation to selectively orient the first side so that the first side faces away from the longitudinal axis, is perpendicular to the longitudinal axis, is parallel to the longitudinal axis and/or is transverse to the longitudinal axis, depending on the configuration of the storage wall and the way that the air tank supports are mounted relative to that storage wall.

In a further embodiment, the storage wall in the retrieval mode can extend laterally from a side of the firefighting apparatus a preselected distance. The preselected distance can be sufficient to enable a user to load and/or retrieve one or more self-contained breathing apparatus from the storage wall. The distance also can be sufficient to place the storage wall outside the compartment so that a user can wash the self-contained breathing apparatus stored on the storage wall without substantially filling the compartment with water or other liquids.

In yet another embodiment, a method of using the firefighting apparatus is provided. The method can include storing a contaminated self-contained breathing apparatus, having an air tank in the storage unit, distal from the cab and occupants thereof, to prevent the occupants from being exposed to the contaminants while riding in or otherwise present in the cab.

In yet a further embodiment, the method can include decontaminating or cleaning the self-contained breathing apparatus and storing the same in the storage unit, distal from the cabin occupants thereof. Optionally, upon arrival at the emergency scene, the occupants can access the storage unit, remove and don the self-contained breathing apparatus to commence activity at the emergency scene.

In still yet a further embodiment, the method can include: providing a firefighting apparatus comprising a cab and a body located rearward of the cab, the body including a storage unit configured to store a self-contained breathing apparatus; exposing a compartment having a storage wall joined with a plurality of air tank supports; providing a self-contained breathing apparatus, having an air tank, that has been contaminated by a harmful chemical at an emergency scene; storing at least the air tank associated with the self-contained breathing apparatus on at least one of the air tank supports; and entering the cab of the firefighting apparatus without the air tank being present in the cab. The self-contained breathing apparatus, having an air tank, that has been contaminated by a harmful chemical at an emergency scene is stored in the storage unit, rather than in the cab to reduce exposure of the at least one occupant to the harmful chemical while the at least one occupant is in the cab.

In another further embodiment, the method can include rotating the storage wall about an axis of rotation so that the air tank supports faces generally outward, away from a longitudinal axis of the truck; and placing a contaminated or clean air tank on an air tank support.

The current embodiments provide a simple and effective construction that can isolate contaminated equipment, such as a self-contained breathing apparatus, from a cab in which occupants such as firefighters, emergency responders and other personnel are located or ride. In turn, the contaminants of the equipment, which may be harmful chemicals that are hazardous, toxic and/or carcinogenic, are not inadvertently introduced into the cab. In turn, this can reduce the likelihood of and/or prevent in some cases exposure to the harmful chemicals, thereby potentially improving the health and mortality of the firefighters, emergency responders and other personnel who utilize the equipment and/or the vehicle. With the current embodiments, self-contained breathing apparatus and associated tanks can also be stored in the firefighting apparatus, rather than in a firehouse and/or in the cab of the firefighting apparatus. This storage of the self-contained breathing apparatus on the truck firefighting apparatus can, however, increase the amount of time that it takes a firefighter or responder to don their equipment and prepare for activity at an emergency scene. Accordingly, the current embodiments are counterintuitive and fly in the face of conventional firefighting preparedness and response time because instead of reducing the amount of time to address events at an emergency scene, the current embodiments can actually increase that amount of time.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

A current embodiment of a firefighting apparatus is illustrated in FIGS. 1-6 and generally designated 10. As shown, the firefighting apparatus can be in the form of a pumper fire truck that is configured to pump large volumes of firefighting fluid from a fluid source, through one or more fire hoses, onto a fire to extinguish or suppress the fire. Although referred to as a firefighting apparatus, as used herein, that term can also include a variety of emergency vehicles, rescue vehicles and other modes of transportation such as aerial ladder trucks, trailers or other equipment. Generally, the apparatus, also referred to herein as a fire truck, can be a self-propelled and mobile vehicle.

The fire truck 10 can include a chassis which can be further mounted to multiple wheels 32F, 32R. The wheels can be attached to conventional front and rear axles, which can be attached to the chassis of the truck. The fire truck can be mobilized via an internal combustion engine which drives the wheels via a transmission.

The fire truck 10 can include one or more internal electronic or computer controls that can operate the engine, transmission, or steering control mechanism to enable the front wheels to be steered upon transport to an emergency location. As used herein, an emergency location or emergency scene can be a scene of a fire, an area with harmful, hazardous, toxic and/or carcinogenic chemicals present, an area of a chemical spill or discharge of any type, a traffic accident, a boating accident, a plane accident, a man-made or natural disaster, and/or a terrorist attack, or any other location where one or more lives or property are endangered or otherwise compromised.

The fire truck 10 can include a forward portion 31 and a rearward portion 33 located at opposite ends of the fire truck 10. The forward portion 31 can include a cab 34. The cab 34 can house occupants, such as firefighters, emergency responders, rescue personnel, or other personnel as they are transported to and from an emergency location. The cab 34 can include conventional controls, such as a steering mechanism and various displays inside the cab to monitor and evaluate the operation of the vehicle 10. The cab can include a number of seats for the occupants, and can be the portion of the fire truck where the occupants enter and sit in the fire truck for transport. The cab can terminate a distance of several feet rearward of the front wheels 32F, or generally forward of the pump controls and/or rearward portion 33 of the fire truck 10. The fire truck 10 can include one or more doors 41, 43 that offer ingress and egress into the interior 341 of the cab 34.

The rearward portion 33 can include a body 37 which is described in detail below. The rearward portion 33 can include rear wheels 32R and the associated rear axle 32AR, which can be located under the body optionally in the rearward half of the length LF of the fire truck 10. The front or steering wheels 32F can be located in the forward portion 31 of the fire truck, mounted via a front axle 32AF. The front wheels 32F can be located under the cab, optionally in the forward half of the length LF of the fire truck 10. The wheels 32F, and 32R can be mounted on one or more axles, for example a front axle 31A and a rear axle 33A. The front axle 31A can be located in the forward portion 31, under the cab 34, and the rear axle can be located in the rearward portion 33. The front axle can include a steering system to enable the front wheels to be steered. The rear axle can have one or more drive components to assist in propelling the truck 10. The rear axle can be joined with a transmission of the vehicle with a drive shaft (not shown). Although shown with a single rear axle 33AR, the apparatus or truck described herein can include multiple rear axles.

In the fire truck 10 illustrated, behind the cab 34, on the body 37, a pump control panel can be mounted. Under or behind the pump control panel, one or more pumps can be mounted. These pumps can be mounted to the frame. Generally, the pumps can be in fluid communication with a firefighting fluid tank mounted to the frame in the rearward portion 33 and/or a source of firefighting fluid external to the truck, such as a fire hydrant. The pumps also can be in fluid communication with one or more hoses or waterways of the truck. The pumps can be configured to convey firefighting fluid from the external source or the tank to the waterways to one or more fire hoses in a forced manner so that the firefighting fluid can be applied to a fire.

Figure 3:
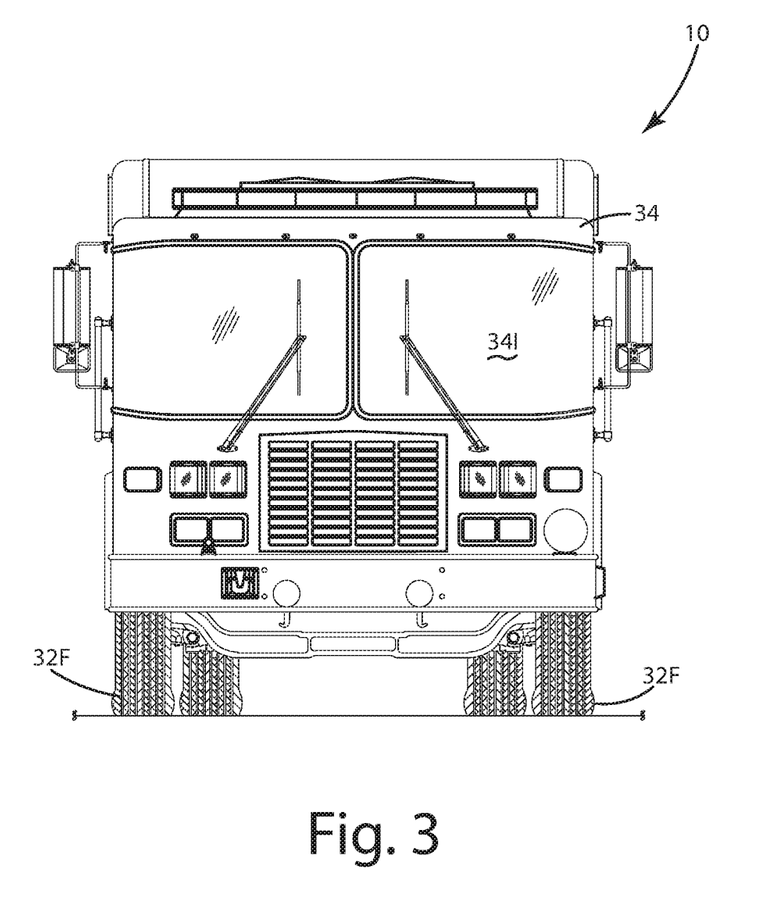
FIG. 3 is a front view of the apparatus.

The body 37 also can include compartments or lockers 38 mounted rearward of the cab in the rearward portion 33 of the fire truck 10 on one or both lateral sides 35A or 35B, which are disposed on opposite sides of the longitudinal axis LA that extends generally along the length of the truck, optionally bisecting it as shown in FIG. 3. These compartments can be located on and accessible from the respective first side 35A or the second side 35B of the fire truck 10, and can be sized and configured to store supplies and equipment useful for easy access at an emergency location. Generally, the compartments can be sized such that they do not extend across the longitudinal axis LA of the truck from one side to the other. Put another way, the compartments generally can be shallower than one half the width W of the truck, which extends from one side of the truck to the other. Multiple lockers or compartments can fill a substantial portion of the lateral sides of the truck of the body. Some compartments can be mounted forward of the rear axle, some over the rear axle, and some rearward of the rear axle. Further optionally, the compartments associated with the body can be rearward of the front axle and rearward of the cab 34.

As shown in FIGS. 1 and 4-7, the fire truck 10 includes a specialized compartment in the body 37 in the rear portion 33. The specialized compartment can be in the form of a storage unit 60 configured to store a self-contained breathing apparatus 100, contaminated by harmful chemicals at an emergency scene, in the body 37 rather than in the cab where occupants ride, so the occupants are not exposed to the harmful chemicals as described below. This storage unit is distal from the cab 34, and in particular the interior 341 of the cab.

An exemplary self-contained breathing apparatus 100 is shown in FIG. 7. There, the apparatus 100 can include an air tank 101 that is mounted to a harness 102. The air tank can be in fluid communication with a mask 103. The harness 102 is designed to fit over a user, such as a firefighter or rescue personnel. The air tank 101 is configured to mount adjacent the back of the user. The mask 103 is configured to be worn over the face or a portion of the face of the user. The air tank delivers a stream of oxygen or other gas to the mask so that the user need not inhale harmful chemicals, smoke or other airborne materials at an emergency scene.

Generally, the air tank 101 and be constructed from a metal, composite and/or polymeric material. The air tank can be substantially cylindrical as shown, but of course other structures for the air tank can be utilized, pending on the application. The storage unit 60 can include a storage wall 70 mounted on upper and lower telescoping rail systems 81, 82, and can be selectively movable relative to a compartment opening from a storage modes, where the storage wall is disposed in a compartment to a retrieval mode R, where the storage wall extends beyond the opening so a user can access air tank supports 90 to store and/or retrieve a self-contained breathing apparatus 100.

As mentioned above, the storage unit 60 can be configured to store the self-contained breathing apparatus 100 and its components such as the air tank 101 in the storage unit 60. The storing activity can occur before and/or after the self-contained breathing apparatus 100 is utilized by firefighter or other user at an emergency scene. For example, the self-contained breathing apparatus 100 can be stored in the storage unit 60 on the fire truck 10 before the a firefighting company including a firefighter is called or summoned to an emergency scene. Storing this self-contained breathing apparatus and its components on the truck, in the storage unit, however, can add time, for example optionally at least 30 seconds, further optionally at least one minute, even further optionally at least one and a half minutes to a firefighter's time in deploying from the fire truck 10 and engaging in activity at an emergency scene.

This is counterintuitive and against the culture of the firefighting community. Specifically, firefighters frequently strive to deploy from a location fully dressed with boots, bib coat and all the other equipment helmet that they will utilize at an emergency scene. Typically, all of this equipment, including a self-contained breathing apparatus is either donned by the firefighter entering the truck, or placed immediately adjacent the firefighter on a seat or location in the cab 34 of the truck 10. This is so that the firefighter can exit the truck, and in the process, install the self-contained breathing apparatus 100 on themselves. Again, this enables the firefighter to quickly deploy from the truck and start time critical work at the emergency scene.

The current embodiments, however, if implemented to store one or more self-contained breathing apparatus for firefighters on the body 37, distal from the cab 34 and the occupants, that is the firefighters or other personnel in the cab 34, goes against the firefighters' desire to have that apparatus 100 in close proximity to them, inside the cab. Thus, is counterintuitive within the firefighting community. Furthermore, storing self-contained breathing apparatus in a storage unit, in the body of the truck, rather than in the cab, also is counterintuitive and can be can lead to anxiety on the part of the firefighter because that self-contained breathing apparatus is a significant piece of equipment when it comes to preventing smoke inhalation by the firefighter at the scene. Thus, with the storage unit and current embodiments, a firefighter does not have that apparatus in close proximity in the cab en route to or from an emergency scene. This can make the firefighter feel anxious about their impending deployment at a scene.

In addition, storing the self-contained breathing apparatus in the storage unit after activity at an emergency scene also can be counterintuitive. For example, by doing so, the self-contained breathing apparatus becomes one more piece of equipment that is later removed from the truck, cleaned, back at the firehouse or elsewhere, and then put back on the truck in the storage unit.

As noted above, when a firefighter or other personnel conducts activity at an emergency scene, they can be subject to a variety of contaminants, such as one or more harmful chemicals. As used herein, a harmful chemical can be any hazardous, toxic and/or carcinogenic chemical, compound, material or other matter that is otherwise deleterious to health. Harmful chemicals might not include materials that are otherwise benign to human health, for example water, air, and other natural chemicals that are present in every day environments. Harmful chemicals can include, for example, perfluorinated compounds (PFCs) found in some types of firefighting foams, polychlorinated and polybrominated dioxins and furans which are combustion byproducts of halogenated flame retardants, acrylonitrile, arsenic, benzene, polycyclic hydrocarbons, cadmium, chlorophenols, chromium, carbon monoxide, dioxins, ethylene oxide, formaldehyde, orthotoluide, polychlorinated biphenyls, vinyl chloride, combinations of the foregoing and other chemicals. In many cases, the harmful chemicals noted herein can attach to anything they contact, for example, the self-contained breathing apparatus and its components such as the tank, harness mask etc. In many cases, the harmful chemicals can off gas dangerous fumes, particulate or other material for minutes, hours, days, weeks, months following a fire or spill. The contaminated gear, such as a contaminated self-contained breathing apparatus, when stored inside the truck, can contaminate the inside of that truck and the cab interior with the harmful chemicals.

When the contaminated gear, such as a contaminated self-contained breathing apparatus 100. Is stored in the current storage unit 60, however, the harmful chemicals that remain on that apparatus can remain inside the storage unit, that is, inside the body, distal from any occupants or other personnel until the storage unit is opened to expose the self-contained breathing apparatus. In this manner, the harmful chemicals the contaminate the self-contained breathing apparatus and its components, for example the air tank, mask and harness can be isolated from firefighters and other personnel.

The structure of the storage unit 60, as shown in FIGS. 2-7, can define a compartment 50 that includes a movable storage wall 70 mounted on upper 81 and lower 82 telescoping rail systems. The storage wall 70 can be selectively movable relative to the compartment 50 and its opening 51 from a storage mode S (FIGS. 2 and 4) where the storage wall and any self-contained breathing apparatus 100 thereon is disposed in the compartment 50, to a retrieval mode R (FIGS. 2 and 5-6), where the storage wall 70 extends at least partially beyond and/or through the opening 51 so a user can access air tank supports 90 to place a self-contained breathing apparatus 100 and/or to retrieve the same relative to the storage wall 70.

Figure 1:
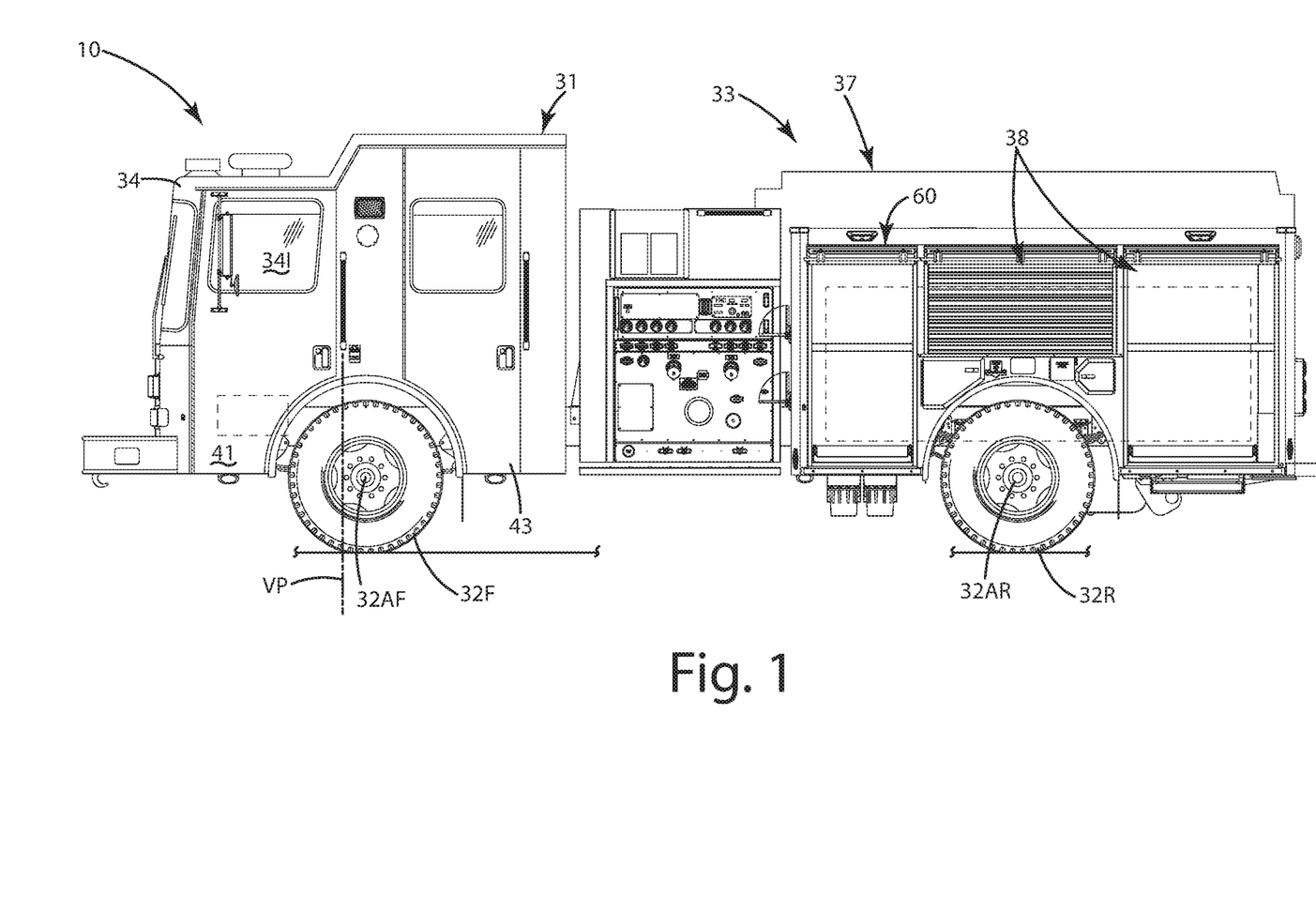
FIG. 1 is a side view of a firefighting apparatus in the form of a fire truck including a self-contained breathing apparatus storage unit according to a current embodiment, with a storage wall of the storage unit in a storage mode, inside a compartment defined by a body of the truck.
Figure 2:
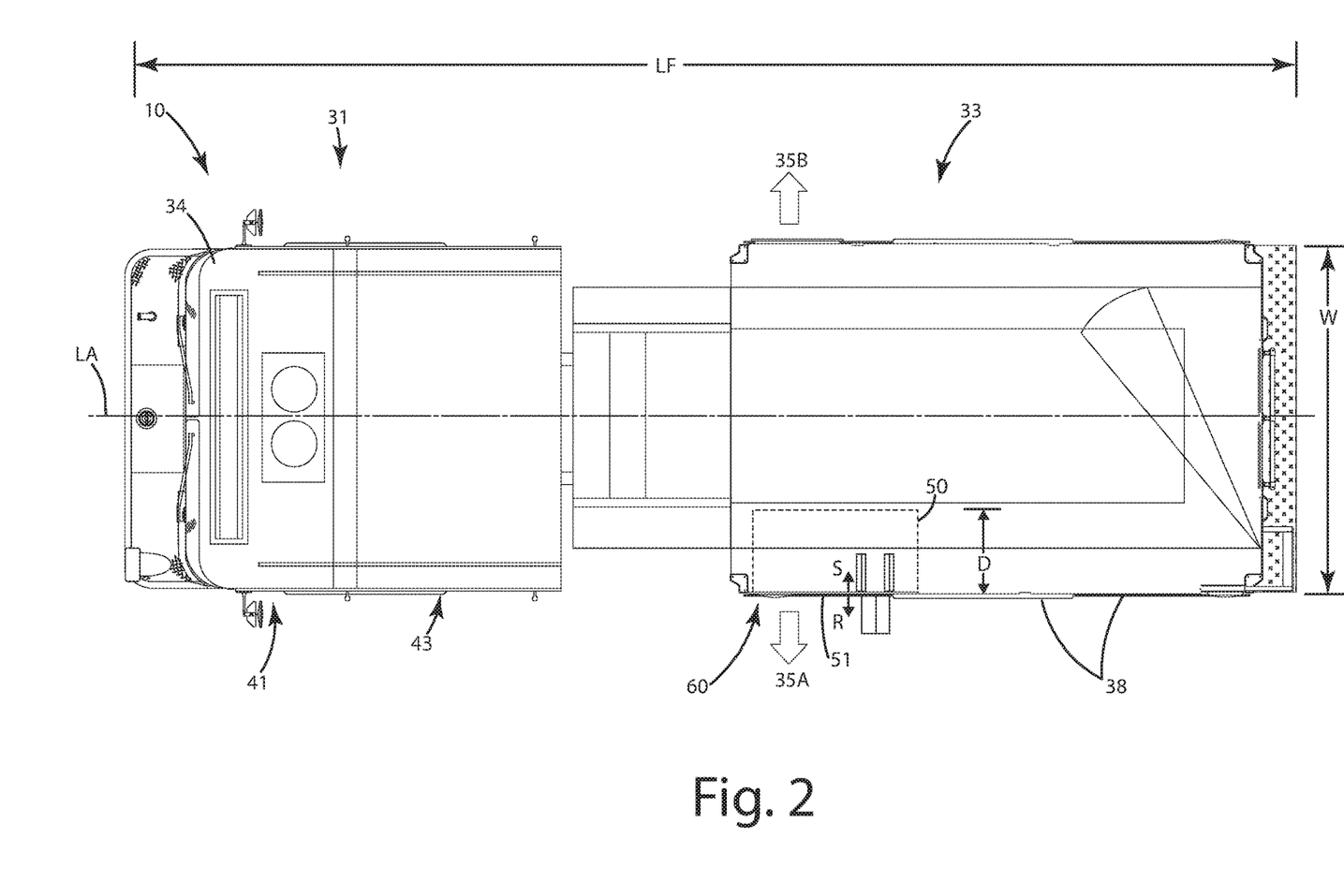
FIG. 2 is a top view of the apparatus with the storage unit in a retrieval mode.
Figure 4A:
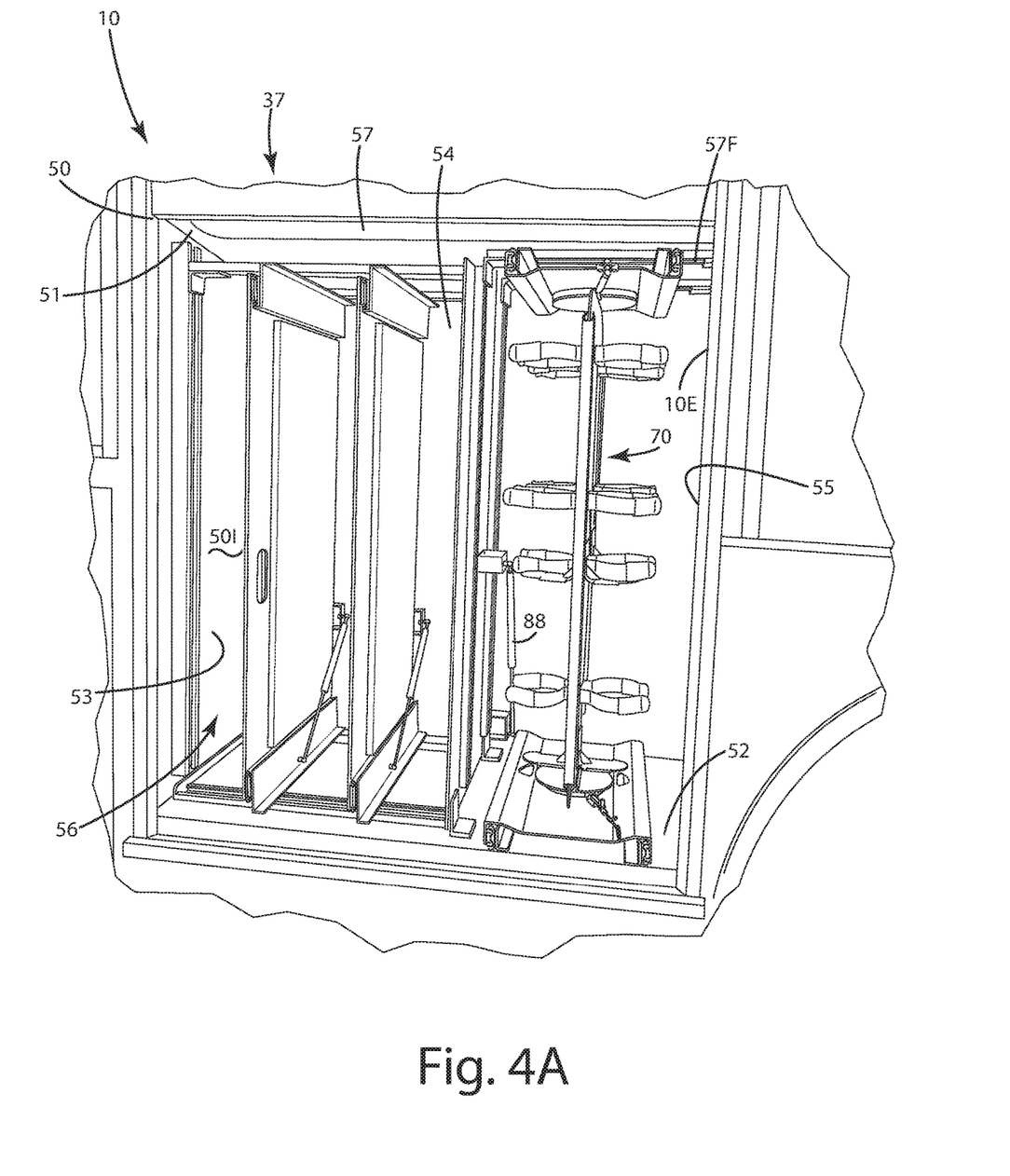
FIG. 4A is a side perspective view of the apparatus with the storage unit in a storage mode.
Figure 4B:
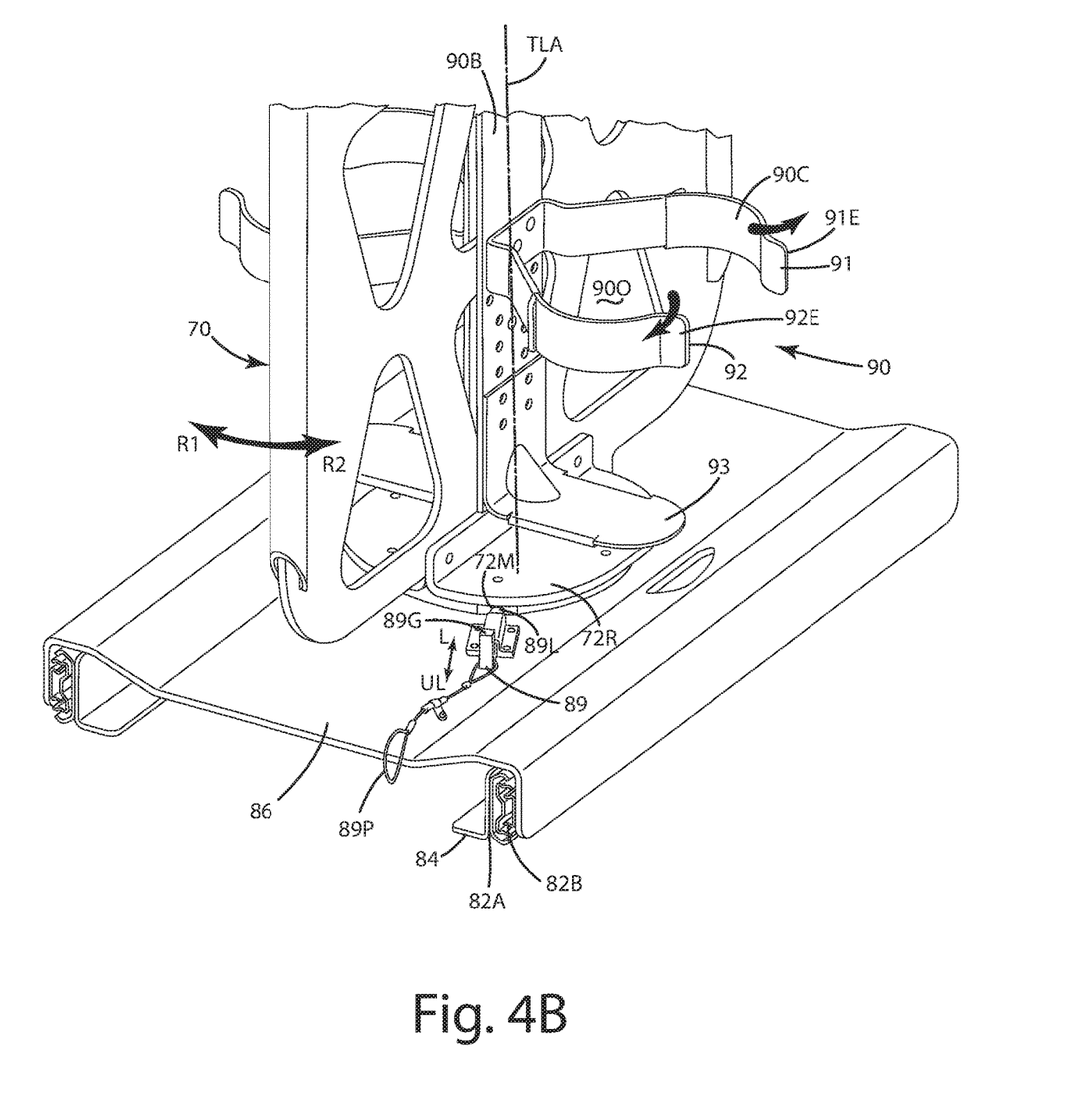
FIG. 4B is a close up view of a lower part of a storage wall of the storage unit.

With reference to FIGS. 2 and 4, the compartment 50 is defined by multiple walls. For example, the compartment 50 can be defined by an upper wall 51 a lower wall 52 and one or more sidewalls 53, 54 and 55. The compartment 50 can define an opening, 56 that provides access to the interior 50I of the compartment 50. The opening 56 can be closable by closing a door 57 over the opening. As shown, the door 57 can be a roller type door with multiple connected plates that can be drawn downward to close the opening 56. Of course, other types of doors can be utilized, for example hinged doors, sliding doors, or other closures configured to close the opening 56.

The interior 50I of the compartment 50 can be sized to receive one or more storage walls 70 as shown, to store multiple self-contained breathing apparatus or similar equipment depending on the application. As shown, the interior 50I can include other types of equipment adjacent the storage wall. Other gear, such as bibs, coats and helmets optionally can be stored in the interior 50I of the compartment with a self-contained breathing apparatus. Generally the door 57 is closable over the opening 56 of the compartment 50 so that the wall 70 is not viewable or accessible. The door can include a lock to secure the contents of the compartment.

The compartment 50 and the components of the interior 50I can be constructed from a durable, water and chemical resistant material, such as stainless steel, aluminum, polymers and/or composites. The storage wall, rail systems and air tank supports likewise be constructed from similar materials so that they can be washed down, optionally at the emergency scene before departing the scene to remove contaminants such as the harmful chemicals mentioned herein.

As illustrated, the storage unit 60 and its compartment 50 can be disposed above the drive train of the truck and optionally above certain pumps and other mechanical apparatus of the truck. The compartment 50 can extend across a portion of the width W of the truck (FIG. 2). In most cases however, the compartment extends and is disposed only on a single side 35A or 35B of the truck 10. The compartment 50 also can be configured to be a depth D that that does not extend from the opening past the longitudinal axis LA of the truck. Optionally, depth D can be less than half the width W of the truck. Again, the depth might not extend to the longitudinal axis LA from the exterior 10E of the truck on the side 35A as shown in FIG. 2.

The compartment 60 and its respective walls can be of a box shape forming a container that is substantially transverse to the longitudinal axis LA of the truck. Due to the lay of the compartment, the storage wall 70 and the respective upper 81 and lower 82 rail systems as described below can be configured to move from the storage mode to the retrieval mode along or parallel to a line of movement S-R (FIG. 2) that is transverse to the longitudinal axis LA of the truck. As shown, the line of movement S-R is transverse, and optionally perpendicular to, the longitudinal axis LA of the truck.

Figure 5:
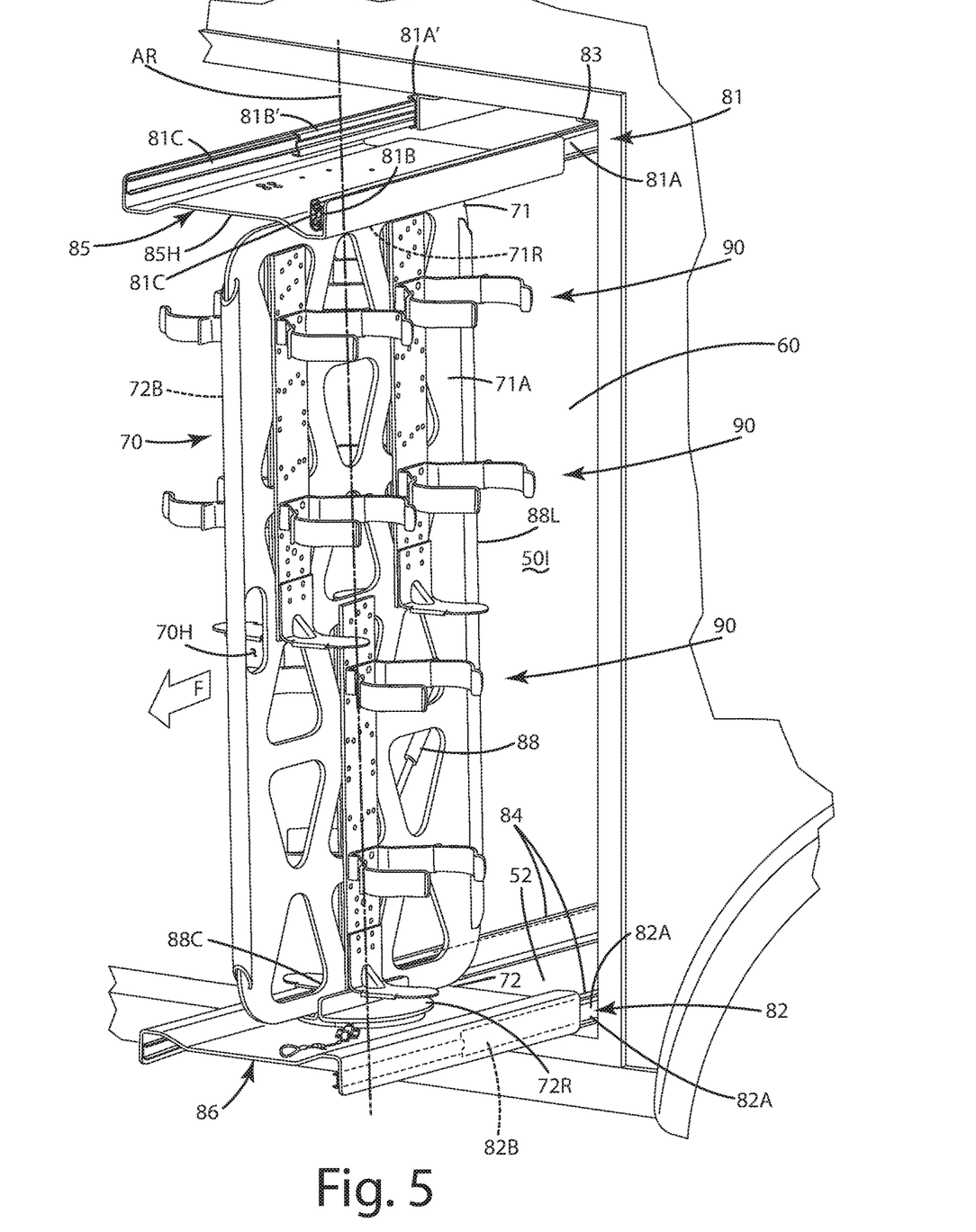
FIG. 5 is rear side perspective view of the apparatus with the storage unit in a retrieval mode.
Figure 6:
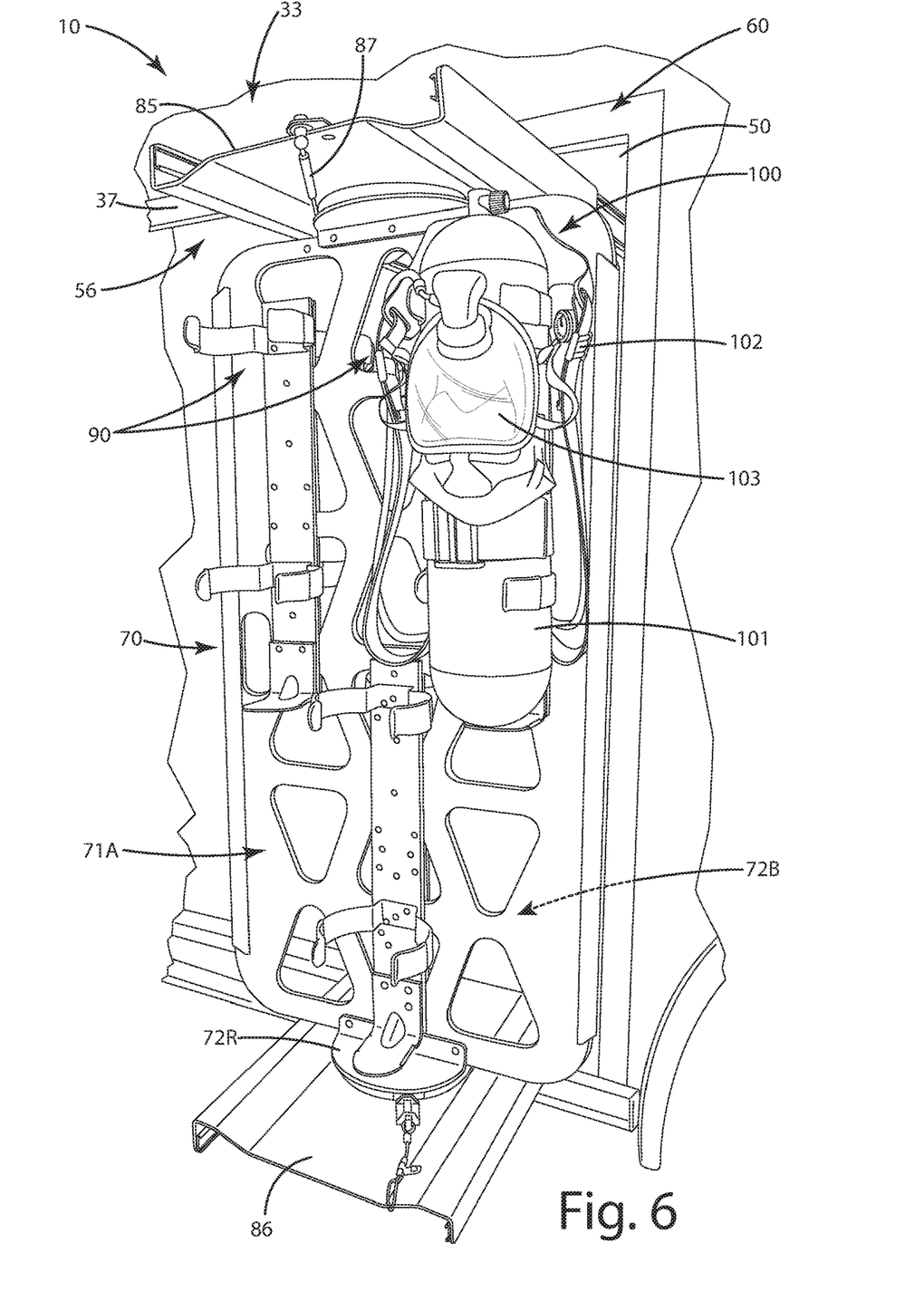
FIG. 6 is a side perspective view of the storage unit in a rotated mode within the retrieval mode.

Referring to FIGS. 2-6, the storage wall and the respective upper and lower rail systems are movable from a storage mode shown in FIGS. 2 and 4 to a retrieval mode shown in FIGS. 5 and 6. In the storage mode, the storage wall 70 and upper and lower rail systems 81, 82 are located substantially within the compartment 50 of the storage unit 60. Likewise, any self-contained breathing apparatus 100 and tanks associated therewith are located substantially within the compartment 50 of the storage unit, generally disposed on the air tank supports 90. In the retrieval mode, the storage wall 70 and upper and lower rail systems 81, 82 extend at least partially laterally from the lateral side 35A of the truck 10 a preselected distance. Optionally, this distance can be 1 foot to 5 feet, optionally about 3 feet.

As shown in FIGS. 4-8, the upper 81 and lower 82 rail systems are shown supporting the storage wall 70. The upper rail system 81 can include a first upper rail 81A and a second upper rail 81B. Optionally, the first upper rail 81A can be joined with a mounting bracket 83 that can be mounted to one or more of the walls, for example the upper wall 54 or some other frame 57F disposed in the compartment 50. The first and second rails can be movably and/or telescopically mounted relative to one another with a plurality of bearings 81C disposed between the rails. Of course, the bearings can be absent in the rails can simply slide relative to one another.

The second upper rail 81B can be joined with an upper support plate 85. This upper support plate can include a main body 85H to which the storage wall 70 can be attached. Of course, some cases, the storage wall 70 can simply be attached directly to the second rail, or some other rail of the upper rail system. Optionally, as shown in FIG. 5, the upper rail system 81 can include another set of first and second rails 81A' and 81B' on the opposite side of the plate 85. This can provide additional support for the storage wall 70 if appropriate. Further, as mentioned above, the storage wall 70 can be mounted on the rail systems so that the storage wall can extend out from the opening 83, optionally beyond the outer plane of the exterior 10E of the truck 10, when the storage wall and unit is in the retrieval mode. Depending on the amount of extension suitable for the storage wall, additional rails can be added to the first and second rails.

As shown in FIG. 4B, the lower rail system 82 can include a first lower rail 82A and a second lower rail 82B telescopically joined with one another. These rails can be identical to the rails of the upper rail system 81. Likewise they can be mounted to a lower support plate 86, which is a second rail 82B. The first lower rail 82A can be mounted via a bracket 84 to the lower wall 52 of the compartment 50.

The storage wall 70, as shown in FIGS. 4-6, can be joined with and can extend between the upper and lower rail systems 81 and 82. The storage wall 70 can include an upper end 71 and a lower end 72. The upper end 71 can be joined with the upper support plate 85 of the upper rail system 81, while the lower end 72 can be joined with the lower support plate 86 of the lower rail system 82. The storage wall 70 is illustrated generally plate-like and flat. In this configuration, the support wall can include a first side 71A and a second side 72B, which can be disposed opposite one another. Optionally, in other configurations, the storage wall 70 can include multiple sides and can be of different geometric shapes. For example, the storage wall can be of a triangular cross section with three sides, a square cross-section with four sides or other geometric configurations. In this manner, with additional walls and surfaces, additional air tank supports can be added to those surfaces to store more self-contained breathing apparatus.

The storage wall 70 with its first and second sides, can include multiple air tank supports 90 joined with the storage wall. These air tank supports can be generally identical to one another. The air tank supports can be fastened, welded or otherwise secured to the support wall. In some cases, the components of the air tank supports 90 can be separately constructed and then later joined with the storage wall. In other cases, the storage wall can be stamped or machined in such a manner so as to create the different features of the air tank supports.

With reference to FIG. 4B, each air tank support 90 can include one or more arms. For example, air tank support 90 can include a first arm 91, a second arm and a lower arm 93. The first arm 91 and second arm 92 can be disposed opposite one another across a longitudinal axis TLA of the air tank support 90. These first and second arms can be configured to straddle an air tank 101 of a self-contained breathing apparatus 100. The first and second arms can include a curved interior surface 90C that corresponds to the outer rounded surface of an air tank. These arms optionally can be resilient, such that they can flex away from one another so that a tank can be pushed into the opening 90O thereof. The arms also can be configured to resiliently bias back toward one another to close around the air tank so that the outer ends 91E and 92E of the respective arms secure the air tank in position against the support backer 90B. The lower support arm 93 is the arm upon which the tank can sit on when in the support 90. By the force of gravity, the air tank rest 5 against this lower support arm 93. The tank also can sit in a vertical, upright position with its controls being upright and facing generally upward when the tank is on the support. Although not shown, the supports can include locks or straps to further secure the air tanks and self-contained breathing apparatus. Generally, however, the arms exert a sufficient bias toward one another and/or around the tank to secure the tank in the compartment so that it does not move around or become loosened and from the storage wall 70.

Each side of the storage wall 70 can include multiple air tank supports 90. As shown, three tank supports are disposed on the first side 71A and three on the second side 72B. Fewer or more air tank supports can be added to those respective sides and generally to the storage wall in a variety of orientations, depending on the application.

As shown in FIG. 5, the storage unit 60 can include a first locking member 88 that is joined at one end 88C with the lower support plate 86. Of course it can be joined with the upper support plate, the storage wall and/or one of the rails or brackets. The first locking member 88 is joined at its opposing end 88L to an interior component of the compartment 60, for example a wall or frame thereof. This first locking member 88 can be a pneumatic, hydraulic or other type of ram. The locking member can be configured to provide assistance to the user pulling the storage wall 70 through a portion of the opening and generally out of the compartment. For example, the locking member can be a gas operated cylinder. When the storage wall is in the storage mode, the cylinder can exert a certain leverage on the upper and/or lower plates so that it effectively locks the plates and respective upper and lower system rail systems in a manner to secure the storage wall in the interior 50I of the compartment. The gas cylinder can bias the support plate rearward and into the interior of the compartment so that the plate, and thus the storage wall are effectively locked in that position.

To release the locking member 88, a user can grasp a handle 70H associated with the storage wall 70 and pull on the handle with a force F. The force F is sufficient to overcome the biasing force exerted by the locking member 88 on the support plate. Accordingly, the storage wall can move outward from the interior, passing at least partially through the opening 56 until access to the air tank supports 90 is established. In this manner, the first locking member 88 can lock the storage wall in the storage mode and, can achieve a release condition, thereby allowing the storage wall to move to the retrieval mode. In addition, in the retrieval mode, the first locking member 88, when in the form of a gas cylinder, can be in an extended state and can assist in holding the storage wall in the retrieval mode, generally biasing the support plate away from the rear or side wall 54 of the compartment 50.

After user is done accessing the storage wall 70, they can push the storage wall back into the compartment, which compresses the first locking member 88. When the storage wall is completely within the interior 50I, the first locking member 88 again biases the support plate into the compartment to secure it therein. Of course, other types of locking members can be utilized to store and secure the storage wall in the upper and lower rail systems. For example, a simple pin system can be utilized with the rails to lock the rails in place relative to one another in the different storage and retrieval modes.

Optionally, to provide additional access to the different sides of the storage wall and the corresponding air tank supports, the storage wall 70 can be rotatable about an axis of rotation AR. In other words, the storage wall 70 can be rotatably mounted to the storage unit and more particularly to the upper and lower rail systems and even more particularly to the upper and lower support plates. This can be achieved by including at the upper and lower ends rotation plates 71R and 72R that are rotatably mounted, optionally via axles, or generally rotatable relative to the upper support plate 85 the lower support plate 86. The support plates can come in a variety of constructions and can generally include bearings, rollers and/or other friction reducing elements disposed between the rotation plates and the support plates. In some cases, the rotation plates can include multiple plates or components that are configured to rotate easily relative to one another about an axis of rotation AR, which optionally can be substantially vertical.

Further optionally, the storage wall can be locked in a particular orientation relative to the axis of rotation AR, so that it does not rotate, or is restrained to rotate only within a certain degree of rotation. In particular, the storage unit 70 can include a second locking member 89 engageable with the storage wall and/or its components to prevent the storage wall 70 from rotating about the vertical axis of rotation AR. This second locking member 89 can include a latch 89L that engages a recess 72M of the lower rotation plate 72R to hold and secure the storage wall 70 so that does not rotate. A user can grasp the grasping component 89G of the latch 89, pull on it and withdraw the latch 89L from the recess 72M. Optionally, where a pull tether 89P (such as a cable, cord, rope, web, string or the like) is joined with the grasping component, the user can pull on the cable instead. With the latch withdrawn, the storage wall 70 can rotate in directions R1 and/or R2 to expose the first side and/or the second side storage wall 70. Thus, the second locking member 89 can selectively prevent or allow rotation of the storage wall 70 about the axis of rotation AR when the second locking member 89 is in the locking mode L or the unlocking mode UL as shown in FIG. 4B.

To facilitate rotation of the storage wall 70 about the axis of rotation AR, and actuator 87 can be joined with the storage wall 70, for example, the upper rotation plate 71R. This actuator can be in the form of a gas cylinder. It can be joined with both the upper plate and the rotation plate in a particular orientation so as to urge rotation of the storage wall 70 in directions R1 and/or R2, optionally after the second locking member 89 is disengaged from the lower rotation plate 72R.

A method of using the firefighting apparatus 10 of the current embodiments will now be described with reference to FIGS. 1-6. In particular, the firefighting apparatus 10 can be present at an emergency scene. A user, such as a firefighter or other personnel, can wear a self-contained breathing apparatus 100 with its associated components such as the air tank 101, the harness 102 and the mask 103. While at the scene, the firefighter and thus the self-contained breathing apparatus 100 can encounter one or more harmful chemicals. The harmful chemicals become associated with the material and/or surfaces of the self-contained breathing apparatus and/or the tank. Accordingly, these items become contaminated with the harmful chemical. After the firefighter is completed the activity at the emergency scene, they can return to the truck 10.

At the truck 10, the user can open the door 57 to expose the interior 50I of the compartment 50 of the storage unit 60. The user can grasp the handle 70H of the storage wall 70. The user can pull the storage wall 70 under a force F outward, away from the rear or back wall 54 of the compartment 50. In turn, the second rails of the upper and lower rail systems 81 and 82 telescope relative to the first rails so the second rails extends away from a longitudinal axis LA. Where a first locking member 88 is included in the storage unit, that first locking member can also urge the storage wall 70 through at least a portion of the opening out from the compartment. During this movement, the storage wall 70 is moved relative to the opening 56 and the interior in particular 50I from a storage mode in which the storage wall 70 is disposed in the interior 50I, to a retrieval mode R in which the storage wall 70 extends at least partially beyond and/or through the opening 56. During this movement, one or more of the air tank supports 90 also clear the opening and can be accessible beyond the exterior 10E of the fire truck 10.

The firefighter or user can remove the contaminated self-contained breathing apparatus 100 from their body. In particular, the air tank 101 can be removed from the firefighter's back, and the air mask 103 can be removed from the head. The firefighter can lift or otherwise move the air tank 101 toward at least one of the air tank supports 90. The user can push against the ends 91E and 92E of the respective arms 91 and 92 of the air tank support 90. In so doing, the arms can flex and/or bias outwardly, away from one another. The user can continue to apply force to push the air tank between the arms. After the air tank clears the ends, the arms can resilient bias back toward one another, clamping around the tank 101 and engaging the inner curved surface or other surface 90C against the tank. The tank 101 is thereby held in the opening 90O of the air tank support 90. The tank also can be supported at its lower surface or base via the lower support arm 93. The tank itself can rest via gravity on this lower support arm 93. Where included, an optional strap or other securement lock or arm can be secured around or over the tank to secure the tank in place relative to the air tank support. The remainder of the harness can be draped over and dangle downward from the tank. The mask also can be secured to a portion of the storage wall on a hook or other hanger, although not shown.

Optionally, where a first side 71A of the storage wall becomes full of air tanks 101, the user can rotate the storage wall 70 about the axis of rotation AR to expose the other side 72B to store additional air tanks and self-contained breathing apparatus there. To do so, a user can engage the second locking member 89, pulling on the latch grasp 89G so that the second locking member 89 moves from a locked mode L to an unlocked mode UL. Thereafter, the user can rotate the storage wall 70 in directions R1 or R2 to expose the respective sides 71A or 72B. A gas cylinder can assist in this rotation of the storage wall as explained above. Additional self-contained breathing apparatus can thus be stored on different sides of the storage wall. The storage wall also can be rotatably locked with the second locking member after the storage tanks have been adequately stored.

With the contaminated self-contained breathing apparatus 100 stored on the storage wall 70, the firefighter can engage the handle or other portion of the storage wall or the rail systems and push the storage wall back to a storage mode in which it enters the interior of the compartment, optionally working against the first locking member 88 until the storage wall adequately enters the compartment. At that point, the first locking member 88 also can automatically lock the storage wall, rail systems and/or storage wall in place. After the storage wall is placed in its storage mode, the door 57 can be closed and optionally locked.

Further optionally, in some cases, before the storage wall is moved to the storage mode, the user can wash with a liquid or other material the contaminated self-contained breathing apparatus while it is stored on the storage wall, with the air tanks joined with the air tank supports. The washing can be done with water or non-toxic treatment chemicals to remove the harmful chemicals from the self-contained breathing apparatus and it surfaces. This can be helpful to decontaminate the self-contained breathing apparatus at the emergency scene, where there likely already are many other harmful chemicals. This can in turn leave those harmful chemicals at the emergency scene, rather than bringing them back with the fire truck to the firehouse. After the washing and cleaning of the self-contained breathing apparatus is complete, the storage wall can be moved to the storage mode and the storage unit closed as described above.

After the self-contained breathing apparatus has been stored in the storage unit, the user can enter the cab 34 of the fire truck 10. The cab is distal from the storage unit and the compartment within which the self-contained breathing apparatus is stored. Accordingly, the air tank 101, harness 102 and mask 103 and in general the apparatus 100 is not brought into or present in the interior of the cab. In this manner, the harmful chemicals that may have contaminated the self-contained breathing apparatus are not brought into the cab and are not left in proximity to the firefighter in that closed environment and interior of the cab. Thus, the likelihood that the harmful chemicals is inhaled, ingested or otherwise comes in contact with the occupants of the cab is significantly diminished. In turn, this can reduce exposure of the occupants to the harmful chemicals while the occupants are in the cab. During a return trip back to the firehouse or another location, the occupants of the cab, for example firefighters and other personnel, are not further exposed to harmful chemicals. As a result, it is anticipated that with the current embodiments of the firefighting apparatus, the incidence of firefighters and other personnel being dangerously exposed further to harmful chemicals can be reduced. It is hoped that the incidence of cancer and other diseases inherent in the firefighting community can be significantly reduced.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of using a firefighting apparatus, the method comprising:
   providing a firefighting apparatus comprising a cab for housing at least one occupant, a body located rearward of the cab, a longitudinal axis extending from the cab toward the body, the body including a storage unit configured to store a plurality of self-contained breathing apparatus;
   exposing a compartment of the storage unit having a storage wall joined with a plurality of air tank supports;

moving the storage wall joined with the plurality of air tank supports at least partially within the compartment and relative to the longitudinal axis;

providing a self-contained breathing apparatus, having an air tank, that has been contaminated by a harmful chemical at an emergency scene;

storing the air tank associated with the self-contained breathing apparatus on at least one of the air tank supports; and entering the cab of the firefighting apparatus without the air tank being present in the cab, wherein the self-contained breathing apparatus, having an air tank, that has been contaminated by the harmful chemical at an emergency scene, is stored in the storage unit of the body, distal from the cab, rather than in the cab, to reduce exposure of the at least one occupant to the harmful chemical while the at least one occupant is in the cab.

2. A method of using a firefighting apparatus, the method comprising:

providing a firefighting apparatus comprising a cab for housing at least one occupant, a body located rearward of the cab, a longitudinal axis extending from the cab toward the body, the body including a storage unit configured to store a plurality of self-contained breathing apparatus;

opening a door on the body distal from the cab to expose a compartment of the storage unit having a storage wall joined with a plurality of air tank supports;

providing a self-contained breathing apparatus, having an air tank, that has been contaminated by a harmful chemical at an emergency scene;

moving the storage wall relative to the opening from a storage mode in which the storage wall is disposed in the compartment, to a retrieval mode in which the storage wall extends at least partially beyond the opening;

storing the air tank associated with the self-contained breathing apparatus on at least one of the air tank supports;

entering the cab of the firefighting apparatus without the air tank being present in the cab;

closing the door before entering the cab; and wherein the self-contained breathing apparatus, having an air tank, that has been contaminated by the harmful chemical at an emergency scene, is stored in the storage unit of the body, distal from the cab, rather than in the cab, to reduce exposure of the at least one occupant to the harmful chemical while the at least one occupant is in the cab.

3. A method of using a firefighting apparatus, the method comprising:

providing a firefighting apparatus comprising a cab for housing at least one occupant, a body located rearward of the cab, a longitudinal axis extending from the cab toward the body, the body including a storage unit configured to store a plurality of self-contained breathing apparatus;

exposing a compartment of the storage unit having a storage wall joined with a plurality of air tank supports;

providing a self-contained breathing apparatus, having an air tank, that has been contaminated by a harmful chemical at an emergency scene;

telescoping a second rail relative to a first rail so that the second rail extends away from the longitudinal axis, the second rail joined with a support plate, wherein the storage wall extends at least partially from the compartment;

storing the air tank associated with the self-contained breathing apparatus on at least one of the air tank supports;

entering the cab of the firefighting apparatus without the air tank being present in the cab, wherein the self-contained breathing apparatus, having an air tank, that has been contaminated by the harmful chemical at an emergency scene, is stored in the storage unit of the body, distal from the cab, rather than in the cab, to reduce exposure of the at least one occupant to the harmful chemical while the at least one occupant is in the cab.

4. The method of claim 3 comprising:

moving a first arm away from a second arm while the storage wall extends at least partially from the compartment, placing the air tank between the first arm and the second arm to maintain the air tank in a position adjacent the storage wall, supporting the air tank with a lower support arm under the air tank.

5. A method of using a firefighting apparatus, the method comprising:

providing a firefighting apparatus comprising a cab for housing at least one occupant, a body located rearward of the cab, a longitudinal axis extending from the cab toward the body, the body including a storage unit configured to store a plurality of self-contained breathing apparatus;

exposing a compartment of the storage unit having a storage wall joined with a plurality of air tank supports;

rotating the storage wall about an axis of rotation to access a first side of the storage wall so that the at least one of the air tank supports faces generally outward, away from the longitudinal axis;

providing a self-contained breathing apparatus, having an air tank, that has been contaminated by a harmful chemical at an emergency scene;

storing the air tank associated with the self-contained breathing apparatus on at least one of the air tank supports;

entering the cab of the firefighting apparatus without the air tank being present in the cab, wherein the self-contained breathing apparatus, having an air tank, that has been contaminated by the harmful chemical at an emergency scene, is stored in the storage unit of the body, distal from the cab, rather than in the cab, to reduce exposure of the at least one occupant to the harmful chemical while the at least one occupant is in the cab.

6. The method of claim 1 comprising:

exposing the self-contained breathing apparatus to the harmful chemical at the emergency scene;

removing the air tank from a back of a user before the user enters the cab; and lifting the air tank to the at least one of the air tank supports.

7. The method of claim 1 wherein the moving step includes at least one of rotating the support wall about an axis of rotation and displacing the support wall away from the longitudinal axis.

8. A method of using a firefighting apparatus, the method comprising:

providing a firefighting apparatus comprising a cab for housing at least one occupant, a body located rearward of the cab, a longitudinal axis extending from the cab toward the body, the body including a storage unit configured to store a plurality of self-contained breathing apparatus;

providing a self-contained breathing apparatus, having an air tank, that has been contaminated by a harmful chemical at an emergency scene;

storing the air tank associated with the self-contained breathing apparatus on an air tank support associated with a storage wall of the storage unit, the storage wall disposed between upper and lower telescoping rail systems;

moving the storage wall toward the longitudinal axis and into a compartment defined by the body, such that the upper and lower telescoping rail systems telescope until the storage wall is in a storage mode, inside the compartment;

securing the upper and lower telescoping rail systems so the air tank associated with the self-contained breathing apparatus is located inside the compartment; and entering the cab of the firefighting apparatus distal from the compartment, without the air tank being present in the cab, wherein the self-contained breathing apparatus, having an air tank, that has been contaminated by the harmful chemical at an emergency scene is stored in the storage unit, rather than in the cab, to reduce exposure of the at least one occupant to the harmful chemical while the at least one occupant is in the cab.

9. The method of claim 8 comprising:
rotating the storage wall about an axis of rotation so that the at least one of the air tank supports faces generally outward, away from the longitudinal axis; and
placing the air tank on a lower support arm so that the air tank is in a vertical orientation.

10. The method of claim 8 comprising:
moving the air tank between first and second arms so as to secure the air tank to the storage wall; and
placing the air tank on a lower support arm so that the air tank is in a vertical orientation.

11. The method of claim 9 comprising:
rotating the storage wall about a vertical axis of rotation so that the first and second arms face away from the longitudinal axis.

12. A firefighting apparatus comprising:
a plurality of wheels configured to enable transportation of the apparatus to an emergency location;
a forward portion having a cab for housing at least one occupant;
a body located rearward of the cab;
a rear axle under the body;
a side to side width extending across the body from a first side to a second side opposite the first side;
a longitudinal axis extending from the cab toward the body, the body including a storage unit configured to store a plurality of self-contained breathing apparatus, the storage unit comprising:
  a plurality of walls and a door defining a compartment, the door closable over an opening of the compartment;
  a first upper rail and a second upper rail telescopically joined with one another, the first upper rail being joined with a first wall of the plurality of walls, the second upper rail configured to extend and retract away from and toward the longitudinal axis;
  an upper support plate mounted to the second upper rail;
  a first lower rail and a second lower rail telescopically joined with one another, the first lower rail being joined with a second wall of the plurality of walls, the second lower rail configured to extend and retract away from and toward the longitudinal axis;
  a lower support plate mounted to the second lower rail;
  a storage wall extending between the upper support plate and the lower support plate;
  a plurality of air tank supports joined with the storage wall, each air tank support including at least one arm configured to engage an air tank and maintain the air tank in a position adjacent the storage wall;
  wherein the storage wall is selectively movable relative to the opening from a storage mode in which the storage wall is disposed in the compartment, and a retrieval mode in which the storage wall extends at least partially beyond the opening so that a user can access at least one of the plurality of air tank supports to store an air tank associated with a self-contained breathing apparatus;
  whereby the user can store a self-contained breathing apparatus that has been contaminated by a harmful chemical at an emergency scene in the storage unit rather than in the cab to reduce exposure of the user to the harmful chemical while the user is in the cab.

13. The firefighting apparatus of claim 12,
wherein the at least one arm includes a lower support arm configured to engage a bottom of an air tank, and opposing first and second arms configured to straddle the air tank when the air tank is in an upright position, sitting atop the lower support arm.

14. The firefighting apparatus of claim 13, comprising:
a locking member joined with at least one of the upper support plate, the lower support plate and the storage wall,
wherein the locking member is operable in a locking mode in which the locking member holds the storage wall in either the storage mode or the retrieval mode.

15. The firefighting apparatus of claim 14,
wherein the locking member is a pneumatic cylinder having an end joined with at least one of the plurality of walls, extending to at least one of the storage wall, the upper support plate and the lower support plate.

16. The firefighting apparatus of claim 12,
wherein the storage wall includes a first side and a second side, the first side including a first air tank support, the second side including a second air tank support,
wherein the storage wall includes an axis of rotation,
wherein the storage wall is rotatable about the axis of rotation to selectively access at least one of the first side and the second side.

17. The firefighting apparatus of claim 16,
wherein the storage wall is rotatable about the axis of rotation to selectively orient the first side so that the first side faces away from the longitudinal axis.

18. The firefighting apparatus of claim 12,
wherein the storage wall is rotatable about a substantially vertical axis of rotation,
wherein the storage wall is rotatably mounted to the lower support plate.

19. The firefighting apparatus of claim 18 comprising:
a locking member associated with the storage wall to prevent the storage wall from rotating about the vertical axis of rotation.

20. The firefighting apparatus of claim 12,
wherein the second upper rail and the second lower rail are each extended away from the longitudinal axis when the storage wall is in the retrieval mode,
wherein the storage wall is substantially vertical in the retrieval mode,
wherein the storage wall includes a first side and a second side, each including at least one air tank support unit,
wherein the storage wall is rotatable about an axis of rotation to selectively expose at least one of the first side and the second side,
wherein the storage unit includes a first locking member joined with at least one of the upper support plate, the lower support plate and the storage wall,
wherein the first locking member is operable in a locking mode in which the locking member assists in holding the storage wall in the storage mode or the retrieval mode,
wherein the storage unit includes a second locking member selectively coupled to the storage wall to selectively prevent or allow rotation of the storage wall about the axis of rotation.

\* \* \* \* \*